(12) United States Patent
Ims et al.

(10) Patent No.: US 7,177,900 B2
(45) Date of Patent: Feb. 13, 2007

(54) NON-INVASIVE TECHNIQUE FOR ENABLING DISTRIBUTED COMPUTING APPLICATIONS TO EXPLOIT DISTRIBUTED FRAGMENT CACHING AND ASSEMBLY

(75) Inventors: Steven D. Ims, Apex, NC (US); Brian K. Martin, Cary, NC (US); Thomas F. McElroy, Morrisville, NC (US); Brad B. Topol, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 760 days.

(21) Appl. No.: 10/368,694

(22) Filed: Feb. 19, 2003

(65) Prior Publication Data

US 2004/0162886 A1   Aug. 19, 2004

(51) Int. Cl.
*G06F 15/16* (2006.01)
(52) U.S. Cl. .................. 709/201; 709/203; 709/217; 709/219
(58) Field of Classification Search ............... 709/201, 709/203, 217–219, 223–226, 245, 229
See application file for complete search history.

(56) References Cited

U.S. PATENT DOCUMENTS

| 6,026,474 | A  | * | 2/2000  | Carter et al. ............. 711/202 |
| 6,983,318 | B2 | * | 1/2006  | Doyle ..................... 709/223 |
| 2003/0187935 | A1 | * | 10/2003 | Agarwalla et al. ......... 709/206 |
| 2003/0188009 | A1 | * | 10/2003 | Agarwalla et al. ......... 709/236 |
| 2003/0188016 | A1 | * | 10/2003 | Agarwalla et al. ......... 709/241 |
| 2003/0191812 | A1 | * | 10/2003 | Agarwalla et al. ......... 709/217 |
| 2004/0015538 | A1 | * | 1/2004  | Agarwalla et al. ......... 709/203 |

FOREIGN PATENT DOCUMENTS

WO    WO 01/88762 A    11/2001

OTHER PUBLICATIONS

Tilley Scot R., et al: "Towards a Framework for Program Understanding", Program Comprehension, 1996, Proceedings Fourth Workshop in Berlin, Germany Mar. 29-31, 1996; Los Alamitos, CA, Mar. 29, 1996, pp. 19-28, XP010161999.

M. Tsimelzon, et al: ESI Language specification 1.0, Internet Article, Aug. 4, 2001, XP002286624, URL http://www.w3.org/TR/2001/Note-esi-lang-20010804, retrieved on Jun. 30, 2004, the whole document.

(Continued)

*Primary Examiner*—Ario Etienne
*Assistant Examiner*—El Hadji Sall
(74) *Attorney, Agent, or Firm*—Marcia L. Doubet; Jerry W. Herndon

(57) ABSTRACT

Methods, systems, computer program products, and methods of doing business by caching dynamic content fragments in a distributed cache and assembling requested content using these fragments. The disclosed techniques are non-invasive, and enable the benefits of distributed fragment caching to be extended to more applications, without regard to the programming model used when designing the application. An application developer specifies dependencies among content creating components (or, in alternative embodiments, it may be possible to infer this information), and if one of these components may be called upon to generate a content fragment dynamically, correlator data is programmatically created and attached to a message that references the component. A subsequent content generation request to the component then automatically carries the correlator data, and that data is programmatically restored.

38 Claims, 10 Drawing Sheets

OTHER PUBLICATIONS

Nottingham, Mark et al., "Edge Architecture Specification", by Mark and Xiang Liu, 2001, Akamai Technologies and Oracle Corporation, Jan. 26, 2003, <http://www.esi.org/architecture_spec_1-0.html> (all pages).

Tsimelzon, Mark et al., "ESI Language Specification 1.0", 2001, Akamai Technologies and Oracle Corporation, Jan. 26, 2003, <http://www.esi.org/language_spec_1-0.html> (all pages).

Jacobs, Larry et al., "ESI Invalidation Protocol 1.0", 2001, Akamai Technologies and Oracle Corporation, Jan. 26, 2003, <http://www.esi.org/invalidation_protocol_1-0.html> (all pages).

Basu, Julie et al., "JESI Tag Library 1.0 Specification: Tags for Edge-Side Includes in JSP", 2001, Akamai Technologies and Oracle Corporation, Jan. 26, 2003, <http://www.esi.org/jesit_tag_lib_1-0.html> (all pages).

"Overview: Edge Side Includes (ESI) Overview", 2001, Oracle Corporation and Akamai Technologies, Jan. 29, 2003, <http://www.esi.org/overview.html> (all pages).

"Welcome", Aug. 19, 2002, Akamai Technologies and Oracle Corporation, Jan. 27, 2003, <http://www.esi.org/overview.html>.

"Technical Specification", 2001, Oracle Corporation and Akamai Technologies, Inc., Jan. 27, 2003, <http://www.esi.org/spec.html>.

* cited by examiner

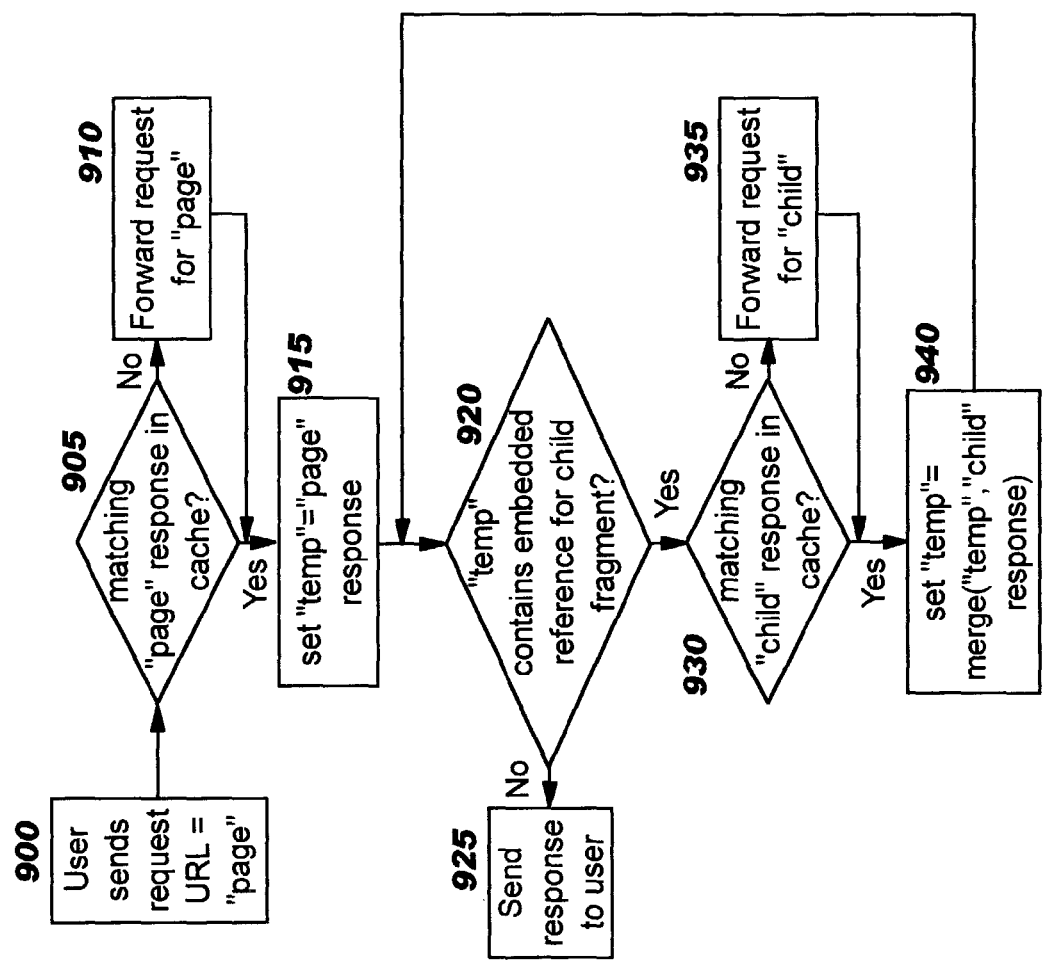

NON-INVASIVE TECHNIQUE FOR ENABLING DISTRIBUTED COMPUTING APPLICATIONS TO EXPLOIT DISTRIBUTED FRAGMENT CACHING AND ASSEMBLY

BACKGROUND OF THE INVENTION

1. Field of the Invention

The present invention relates to computer software, and deals more particularly with methods, systems, computer program products, and methods of doing business by caching content fragments in a distributed cache and assembling content using these fragments.

2. Description of the Related Art

The popularity of distributed computing networks and distributed computing (sometimes referred to as "network computing") has increased tremendously in recent years, due in large part to growing business and consumer use of the public Internet and the subset thereof known as the "World Wide Web" (or simply "Web"). Other types of distributed computing networks, such as corporate intranets and extranets, are also increasingly popular. As solutions providers focus on delivering improved Web-based computing, many of the solutions which are developed are adaptable to other distributed computing environments. Thus, references herein to the Internet and Web are for purposes of illustration and not of limitation.

The early Internet served primarily as a distributed file system in which users could request delivery of already-generated static documents. In recent years, the trend has been to add more and more dynamic and personalized aspects into the content that is served to requesters. Many dynamically-generated documents also include static content, such as forms, graphic images, sound files, and other types of embedded objects. (References herein to already-generated static content are intended to refer equivalently to static content which is incorporated into dynamically-generated documents or other types of dynamically-generated content.)

The number of objects involved in servicing a content request may range from a single stored object to a relatively large number of objects (often, on the order of tens of objects). (The terms "stored object" and "object" are used interchangeably herein to refer to an object or file which is stored on a storage medium—or which may, in some cases, be distributed across more than one storage medium. It should be noted that references herein to objects are not to be construed as limiting the present invention to the field of object-oriented programming. Furthermore, the terms "content" and "document content" as used herein are intended to be synonymous with one or more objects or files unless the reference context indicates otherwise.)

While some content requests are generated programmatically, many content requests have a human user waiting for a response. Returning responses quickly and efficiently can therefore be critical to user satisfaction and to the overall success of an enterprise's Web presence or other distributed computing endeavor. An additional concern in a distributed computing environment is the processing load on the computing resources, and particularly those resources at the back end (i.e., server side) of the network. If a bottleneck occurs, overall system throughput may be seriously degraded. To address this situation, the content supplier may have to purchase additional servers, which increases the cost of doing business.

One technique which has been developed to address these problems is the use of content caching systems, which are sometimes referred to as "Web caches", "cache servers", or "content caches". The goals of a caching system are to store or "cache" content at a location (or at multiple locations) in the computing network from which the content can be returned to the requester more quickly, and to thereby also reduce the processing burden on the back-end systems by serving some requests without routing them to the back-end. Two basic approaches to caching systems are commonly in use. These are called proxies, also known as "forward proxies", surrogates, also known as "reverse proxies". The concepts of content caching, using proxies and surrogates, is well known in the art and will not be described in detail herein.

While caching offers significant advantages within distributed computing environments by reducing the number of requests that reach Web application servers, thereby improving response time and reducing processing load, in many cases, there is room for improvement. For example, there might be dynamically-generated elements in the content that effectively prevents this content from being served from cache. In a traditional caching system, for example, including any type of user-specific information or personalization of some sort in the content typically prevents this content from being reused. (Hereinafter, references to "dynamic content" are intended to include personalized content unless the reference context indicates otherwise.) When content cannot be served from cache, the content requests come to a Web application server. Thus, serving dynamic content has traditionally resulted in increased response time to the requester as well as increased processing burden on the back-end resources.

The concept of "distributed fragment caching" and assembly of these distributed fragments is a relatively new technology, designed to extend the well-known benefits of caching into the dynamic content arena. In general, distributed fragment caching and assembly technology is based on describing Web documents as compositions of smaller fragments. "Fragmentation" of personalized Web documents and documents with dynamic content has the potential to move (at least part of) the document-building workload from the origin server to another location, such as a surrogate or proxy. (In the general case, the caching and assembly of fragments may be done at any location between a client, such as a browser, and the origin application server, inclusive. The term "fragment cache/assembler" or "caching system" will be used hereinafter to refer to the location where fragment caching and assembly is performed, irrespective of how that function may be implemented.) Edge Side Includes ("ESI") is an example of a published specification of this type of fragment technology. Refer to Internet location http://www.esi.org (hereinafter, "the ESI Web site") for more information on ESI.

Software infrastructure is available for distributed fragment caching and assembly. Vendors that support ESI, for example, include Oracle and Akamai. A number of other vendors have expressed support for the ESI initiative. However, exploitation of this software infrastructure is dependent on applications' architectures. Architectures for fragment exploitation are fundamentally different from state-of-the-art "best practices", which typically use a page-level model-view-controller ("MVC") paradigm. Therefore, many existing applications have not been able to leverage the advantages of fragment technology using ESI. As is well known in the art, modifying existing applications can be an extremely costly, complex, and time-consuming process, and when the underlying architecture is not well-aligned, these disadvantages are magnified to such an extent that it is unfeasible to retrofit existing applications to leverage the new technology.

Accordingly, what is needed is a way for enabling existing applications to exploit, without internal modification, distributed fragment caching and assembly.

SUMMARY OF THE INVENTION

An object of the present invention is to enable existing applications to exploit distributed fragment caching and assembly.

Another object of the present invention is to provide this ability without requiring internal modification of the applications.

Yet another object of the present invention is to provide techniques for distributed fragment caching and assembly which align with MVC architecture.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for enabling distributed computing applications to use distributed fragment caching and assembly. In one embodiment, this technique comprises: determining that a content response to be sent over the computing network refers to one or more components that each dynamically create a content fragment, wherein the content response responds to a request for content; determining whether any of the one or more components is dependent upon another component, and/or its invoking component, for data to be used in the dynamic content fragment creation; and if any of the referred-to components are determined to be dependent, attaching correlator data to the content response for use in restoring the data to be used by the dependent components.

Attaching the correlator data may further comprise attaching, for each component that is determined to be dependent, correlator data to the content response for use in restoring the data to be used by that component. Determining that the content response refers to one or more components preferably further comprise detecting inclusion, in the content response, of syntax referring to the one or more components. This syntax may comprise an include statement, for each of the referred-to components, identifying that component (e.g., an ESI statement).

The technique may further comprise: sending the content response with the attached correlator data to a caching system over the network; receiving, at the caching system, the content response with the attached correlator data; determining, by the caching system, that the dynamically-created content fragment of at least one of the components that are referred to in the received content response is needed; and automatically sending, by the caching system responsive to determining that at least one of the dynamically-created content fragments is needed, a subsequent content request over the computing network for each such needed dynamically-created content fragment, wherein the correlator data attached to the received content response is automatically attached to the subsequent content request if the received content response included correlator data. A selected one of the automatically-sent subsequent content requests may be received over the network, in which case the technique preferably further comprises detecting inclusion therein of attached correlator data and restoring the data to be used. The selected subsequent content request may then be forwarded to the selected one of the components that will dynamically create the content fragment, which will the create the dynamic content fragment using the restored data.

The determination of whether any of the one or more components is dependent may comprise consulting a repository comprising component dependencies. Rather than consulting a repository, alternative embodiments may further comprise programmatically inferring dependencies among components. This may be done using static analysis, or run-time analysis, of components to determine calling patterns and shared data.

Attaching the correlator data to the content response may further comprise identifying (for example, by consulting a repository) the data to be used and creating correlator data that identifies a stored version of the data to be used.

The present invention may also be used advantageously in methods of doing business, whereby a service is offered to clients for distributing and assembling fragments of the client's content. This service may be provided under various revenue models, such as pay-per-use billing, monthly or other periodic billing, and so forth, and may offer clients advantages of reduced round-trip time for servicing requests, as well as a reduced computing burden on enterprise resources.

The present invention will now be described with reference to the following drawings, in which like reference numbers denote the same element throughout.

BRIEF DESCRIPTION OF THE DRAWINGS

FIGS. 9A and 9B provide flowcharts depicting logic with which preferred embodiments of the present invention may be implemented.

DESCRIPTION OF PREFERRED EMBODIMENTS

The present invention defines non-invasive techniques for enabling distributed computing applications, and in particular those applications designed according to the MVC paradigm, to exploit distributed fragment caching and assembly. The techniques disclosed herein may operate within a network configuration such as the sample network shown in FIG. 1, where one or more origin servers 120 (i.e., application servers) provide programmatic generation of content meta-data, as will be described herein, enabling a fragment cache/assembler (for example, device 110) to carry out distributed fragment caching and assembly for dynamic content.

Before describing techniques of the present invention, the manner in which distributed fragment caching and assembly is performed using prior art techniques will be described with reference to FIGS. 1–3. These figures illustrate the core elements used for dynamic fragment caching and assembly, as well as the flow of requests and responses required to deliver a Web page comprised of fragments from its origin to a requester.

Figure 1:
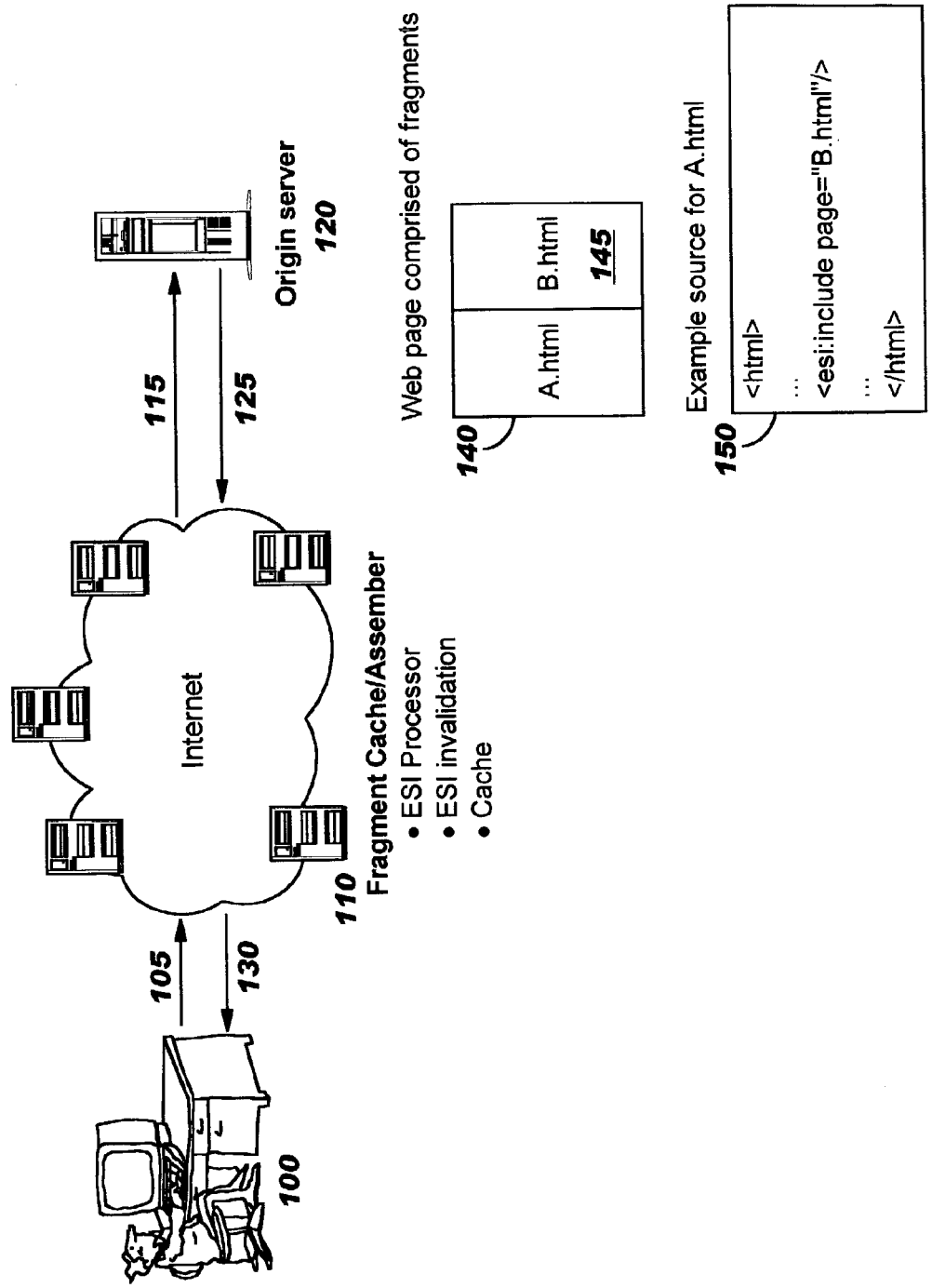
FIGS. 1–3 illustrate distributed fragment caching and assembly, according to the prior art.

As shown in FIG. 1, a content request 105 is sent from a client 100. Suppose this request 105 is for content served by origin server 120, but that the request is intercepted by a fragment cache/assembler 110. Typically, fragment cache/assembler 110 will be near the edge of the network to which client 100 is connected. (Or, it may happen that fragment cache/assembler 110 is merely located somewhere in the network path between client 100 and origin server 120.) Further suppose that fragment cache/assembler 110 is adapted for carrying out prior art fragment caching and assembly, using ESI technology. It is presumed that those of skill in the art are familiar with ESI technology, which will now be described briefly. For more information, refer to the ESI Web site and the descriptions found therein. (In particular, refer to "Edge Architecture Specification", by Mark Nottingham and Xiang Liu; "ESI Language Specification 1.0", by Mark Tsimelzon, Bill Weihl, and Larry Jacobs; "ESI Invalidation Protocol 1.0", by Larry Jacobs, Gary Ling, and Xiang Liu; and "JESI Tag Library 1.0 Specification: Tags for Edge-Side Includes in JSP", contributors Julie Basu, Ajay Desai, Ping Guo, Larry Jacobs, Xiang Liu, Cyril Scott, Mark Tsimelzon, Brian Watson, and Alex Yiu.)

ESI technology uses markup language tags that are embedded within a document or within a content fragment, where these tags are created and embedded by an origin server (such as origin server 120), and specify how one or more fragments are to be assembled to form a complete document. An ESI processor parses these tags and processes them, where this processing may comprise (among other things) generating requests to retrieve fragments that are required for completing the document but which are not locally available in this fragment cache/assembler's cache. ESI tags also specify information such as the cacheability attributes of a fragment, and how the fragments are to be assembled. ESI uses the term "template" or "container" to refer to a document that contains markup language tags referring to fragments, and in which the fragments are to be assembled when locally available.

As an example, suppose the content request 105 is for a Hypertext Markup Language ("HTML") document "A.html", and that this document has been designed to leverage fragment caching by referring to a fragment of HTML code named "B.html", which is to be dynamically assembled into the document A.htrnl upon receiving a client's request for that document. Document A.html might be a generic Web page frame into which the weather report for a particular zip code is assembled or "poured" upon request, so that a requester can receive an up-to-date, location-specific weather report. In this case, fragment B.html might represent the dynamic weather report. FIG. 1 illustrates, conceptually, an outer document A.html with an embedded document B.html at elements 140 and 145. The outer document 140 may also be referred to as a parent, and the embedded document 145 may be referred to as a child fragment.

In the ESI markup language, an "<esi:include . . . >" tag identifies a child fragment that is to be assembled into the container in which this tag is found. Thus, the HTML source for document A.html contains one of these ESI include tags referring to child fragment B.html, as shown at element 150 of FIG. 1.

What is ultimately to be delivered from fragment cache/assembler 110 to client 100 is a complete document that responds to the client's request 105, represented in FIG. 1 by response flow 130. FIGS. 2 and 3 show, in more detail, how fragment caching systems of the prior art accomplish this result.

Figure 2:
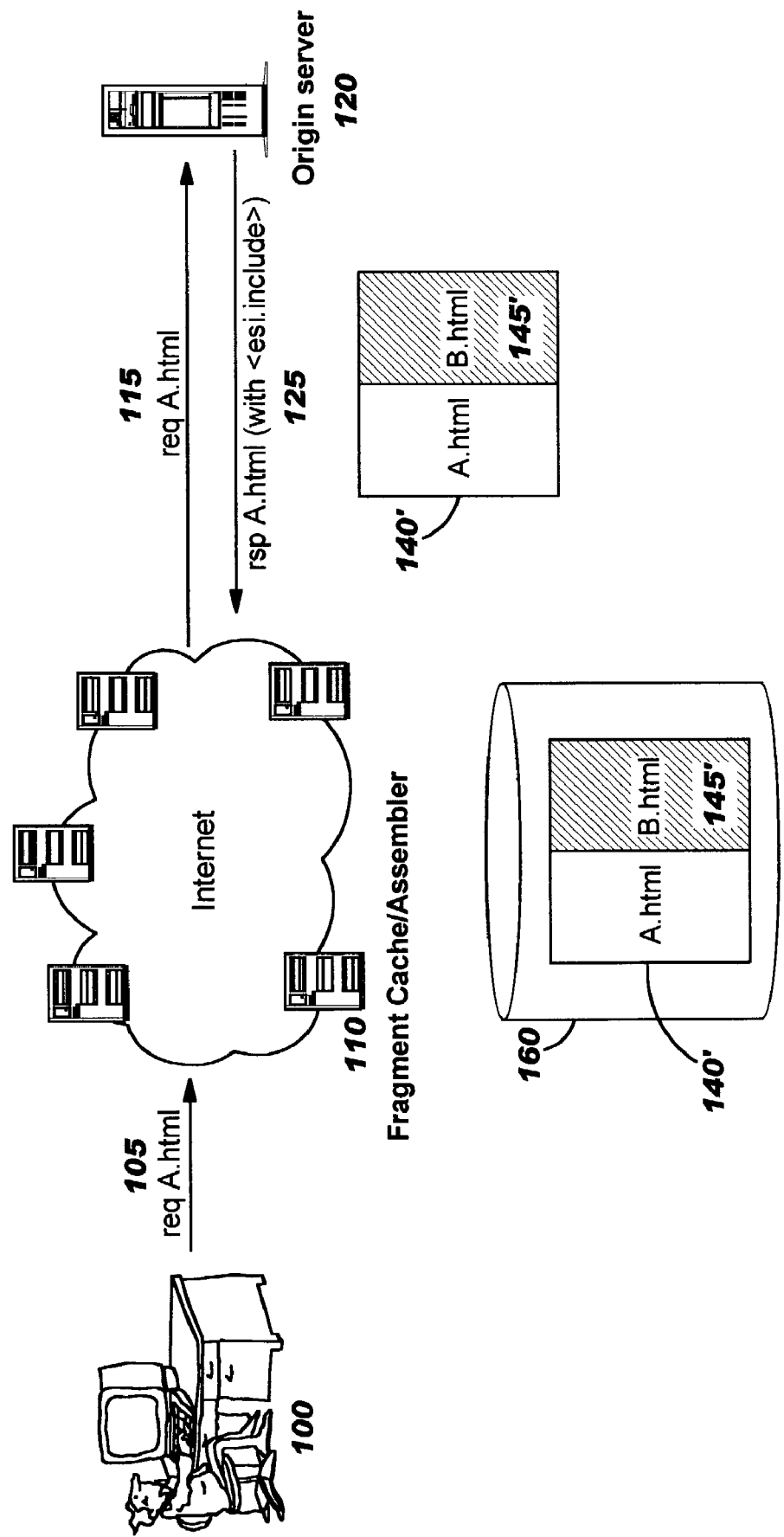
Figure 3:
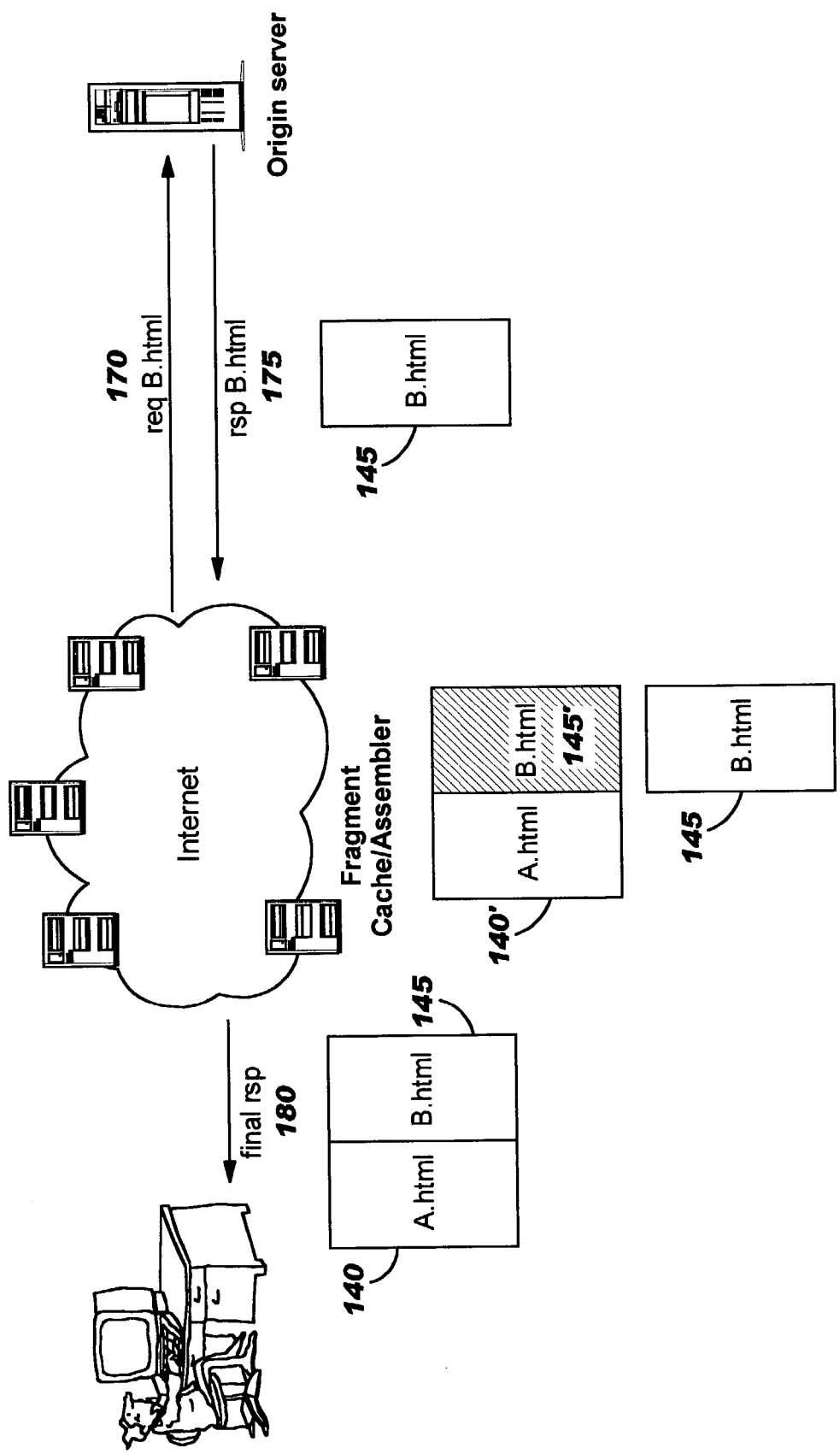

Referring now to FIG. 2, the client's original request for document A.html is shown again at 105. When the fragment cache/assembler receives this request, it checks its local cache to see if it already has a usable version of this document. Suppose that document A.html is not available. The fragment cache/assembler will then forward the client request (as shown at 115) to the origin server 120. Note that this forwarded request 115 also specifies that the request is for document A.html. Thus far, the fact that document A.html has been designed to use fragment caching is transparent to the client and the fragment cache/assembler. Upon receiving the forwarded request 115, the origin server 120 returns a first response 125 to the fragment cache/assembler. This first response contains only document A.html. However, document A.html has been created such that it contains an ESI include tag for its child fragment B.html (as shown at 150 in FIG. 1). Because the content of the child fragment is not transmitted along with document A.html, FIG. 2 refers to these documents as B.html 145' and A.html 140', and uses a cross-hatch pattern for document B.html 145', to indicate that the child fragment is not actually present.

Suppose that document A.html is cacheable. Fragment cache/assembler 110 then caches this document 140' in its local cache, as shown at 160. The ESI processor at the fragment cache/assembler then parses the tags in document A.html, and finds the include tag referring to the child fragment. A subsequent request is therefore automatically transmitted from the fragment cache/assembler to the origin server (or perhaps to another server), requesting the child fragment, as shown at 170 in FIG. 3. The origin server responds 175 with the requested content fragment 145, in this case document B.html.

Upon receiving document 145 with response 175, the ESI processor at the fragment cache/assembler replaces the <esi:include> tag in container 140'(i.e., in the template version of document A.html) with this fragment B.html. A complete response to the client's original request 105 is now available at the fragment cache/assembler, represented in FIG. 3 as element 140, and this document 140 is then returned 180 to the client. (Note that the client need not be aware that the request was assembled from fragments.)

If a fragment such as B.html is itself cacheable, then the fragment cache/assembler stores a local copy in its cache 160. Subsequent requests for document A.html (or for other documents that refer to this fragment B.html) may then use this cached fragment, avoiding (for this fragment) the second round trip 170, 175 to the origin server.

As will be obvious from this simple example, the ability to serve content, including fragments, from the fragment cache/assembler's cache decreases response time to the requester and reduces the processing load on the computing resources at the back end of the network. While the prior art technology that enables use of this approach may offer significant advantages in some scenarios, there are instances where it will not work. This problem will now be described with reference to FIGS. 4–7.

Figure 4:
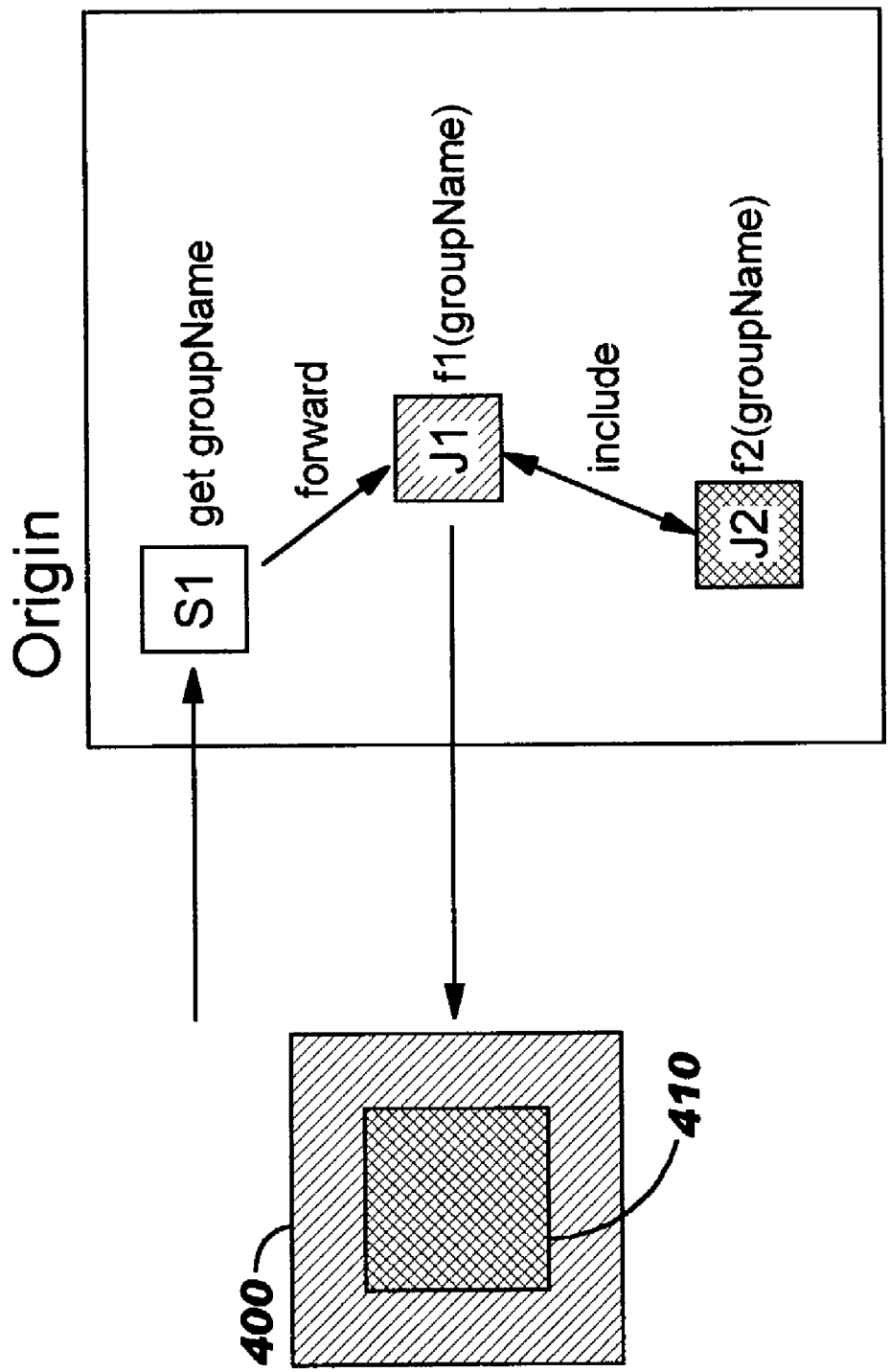
FIG. 4 depicts a page-level model-view-controller approach to application design, according to the prior art.

FIG. 4 illustrates a page-level model-view-controller, or MVC, approach to application design. This approach is the recommended way for designing applications for use in distributed computing and enterprise computing in general, and is therefore referred to herein as current "best practices" for application design. In this approach, a controller obtains and creates, en masse, the data for an entire Web page. This result is referred to as the model. Different uses may be made of this (page-level) model by applying different views, or layouts (physical or conceptual) to the information. For example, one view might select one subset of the information in the model, and another view might select a different subset. This approach is very efficient in scenarios such as database access, where one relatively-expensive "producer" round trip to the database (creating the model) can suffice for multiple "consumer" processes (i.e., the views).

For example, suppose that the page-level MVC approach has been used for creating an application in the J2EE™ ("Java 2 Platform, Enterprise Edition") environment. ("J2EE" is a trademark of Sun Microsystems, Inc.) In this case, suppose that a servlet "S1" is designed as a controller, and that this controller issues a database request where a parameter "groupName=X" identifies the data to be retrieved. This resulting model is then based on this parameter. Once the data matching this query (i.e., the model) is returned to servlet S1 for completion of the Web page, it may be forwarded to two components (shown in FIG. 4 as "J1" and "J2") for convenience in authoring and layout management. For example, component J1 might format the data in the model for presenting as a report to a user, and component J2 might perform calculations upon a column of the data in the model, also for presenting in the report to the user. Thus, J1 and J2 are shown as carrying out some functions "f1" and "f2", respectively, on the model.

The composite document containing content generated by J1 and J2 is shown in FIG. 4 as elements 400 and 410, respectively.

Note that in this example, J2 is not externally accessible. Instead, servlet S1 forwards the model to component J1, and J1 passes the model in its communications with J2. J1, in this example, is designed to return information through an external interface.

Now, suppose that the application owner desires that this application should exploit distributed fragment caching and assembly. Emerging J2EE support for distributed fragment caching and assembly provides a run-time mechanism for mapping the standard J2EE <jsp:include> tag and the <jsp:forward> tag to ESI's <esi:include> tag for distributed assembly. Similarly, the WebSphere® Application Server, version 5, available from International Business Machines Corporation ("IBM®") maps the RequestDispatcher forward and include constructs to <esi:include>. (Refer to "JESI Tag Library 1.0 Specification: Tags for Edge-Side Includes in JSP", discussed above, for more information on how JSP technology and ESI technology may be used together advantageously. Details of this support are beyond the scope of the present discussion. For more information on the RequestDispatcher mappings, refer to documentation on WebSphere Application Server version 5, which is available on the Internet or by contacting an IBM branch office. "WebSphere" and "IBM" are registered trademarks of International Business Machines Corporation.) Before discussing in detail why this approach may prevent S1 from exploiting distributed fragment caching, another real-world example will first be described with reference to FIG. 5.

Figure 5:
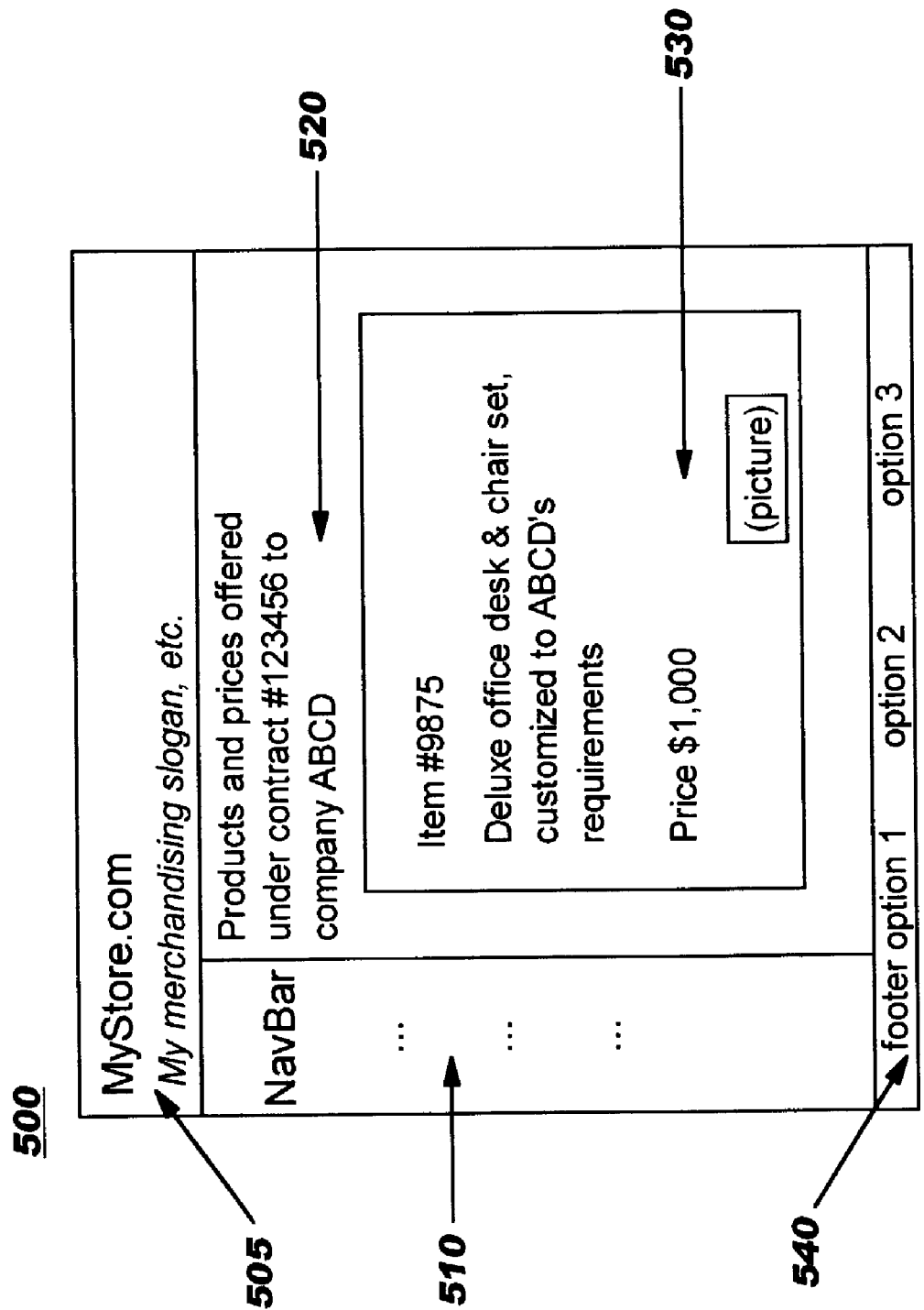
FIG. 5 illustrates a representative prior art Web page layout, where the Web page is composed of some static content and some dynamic content.

FIG. 5 illustrates a representative prior art Web page layout 500. As is common practice, the header 505 and footer 540 areas in this example are composed of static content. The left-most area of the page, indicated by element 510, may also be composed of static content, such as various navigation buttons or hyperlinks. The layout for these static areas of the page would lend themselves to specification within an outermost document or container, such as A.html in the example of FIGS. 1–3. These static areas also are typically fully cacheable.

Now suppose this Web page layout 500 corresponds to an online catalog shopping Web site, and that the application owner (i.e., the merchant) uses structured pricing whereby shoppers are offered the same items at different prices, depending on the shopper belonging to various categories or groups. For example, the merchant might negotiate a contract with a corporate customer to provide products to that corporation at a discount. Other corporate customers might receive the same or different discounts, and perhaps individuals who access the Web site will not receive any discount. Another common example of this type of structured pricing is where a merchant offers an employee discount to shoppers who identify themselves as employees of the merchant. Thus, the shopping application will typically be designed to check identifying information from the shoppers, and then present pricing information based on their identification.

To support this type of shopping, with its varying prices, the example Web page 500 may be designed such that it has (1) an area 530 into which content is rendered dynamically, depicting the item requested by the shopper (perhaps using text and a graphic image), and (2) an area 520 where the corporate client and its relevant contract information are displayed, as appropriate (or omitted in the case of individual shoppers). Thus, areas 520 and 530 are designed for dynamic content in this example Web page. It may be desirable to design this example page layout such that the content for each dynamic area is specified as a fragment. The contract-specific information in area 520 is cacheable for all employees of the particular corporation who are shopping under a particular contract, and thus advantages may be realized by caching such fragments. The content in area 530 is product-specific and contract-specific, and therefore whether advantages can be gained by caching these fragments may vary from one implementation to another.

Figure 6:
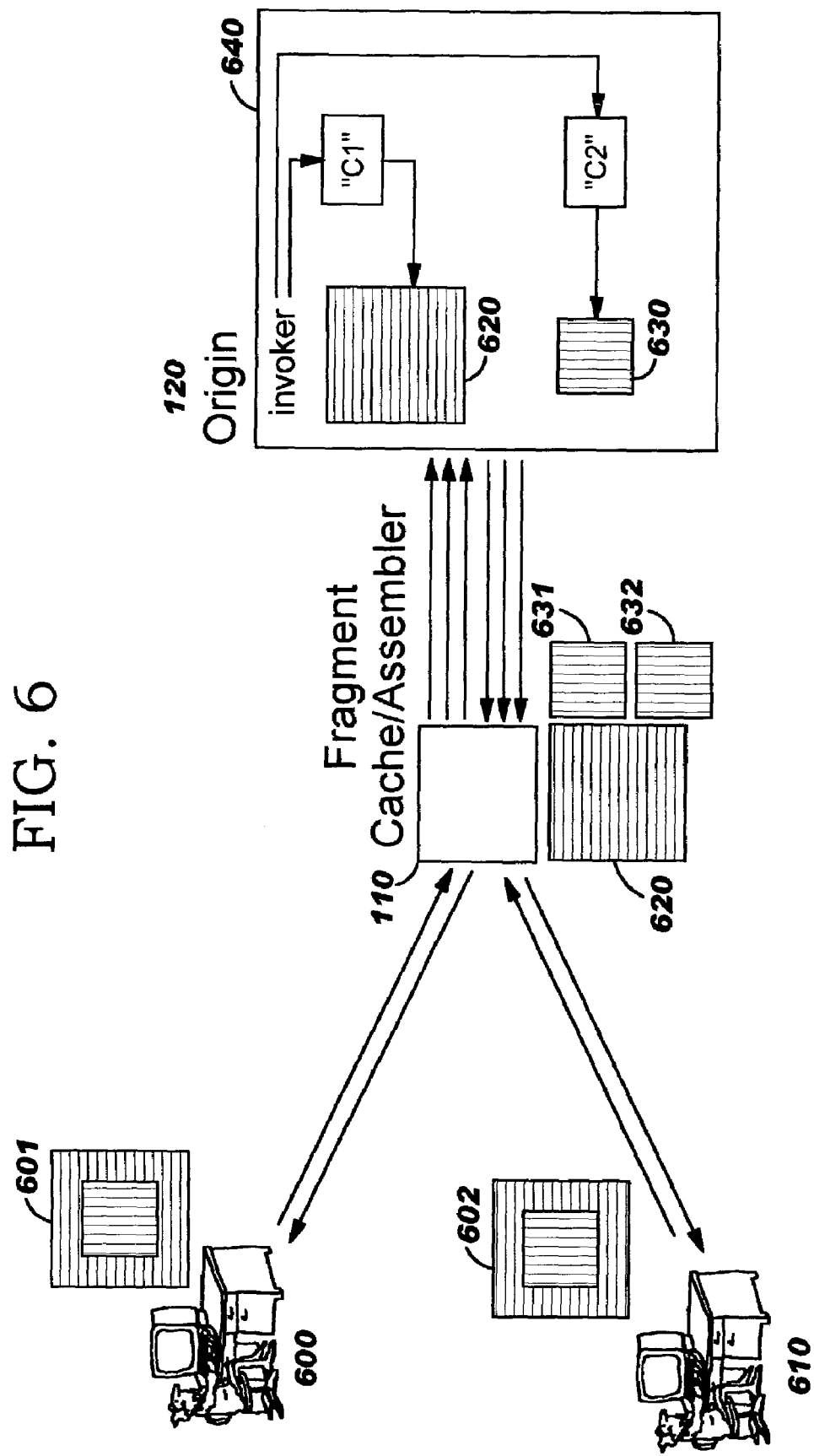
FIG. 6 depicts a distributed fragment caching and assembly approach that may be used to serve the Web page in FIG. 5, using prior art techniques.

FIG. 6 depicts a distributed fragment caching and assembly approach that may be used to serve the Web page in FIG. 5, using prior art techniques. (Note that one of the dynamic areas of the Web page has been removed to simplify the discussion.) In this case, two shoppers 600, 610 are each shopping from the merchant's Web site, and their requests pass through the same fragment cache/assembler 110. In this example, the application 640 at origin server 120 is designed to use two separate and independent components for generating the Web page content. Component "C1", for example, is invoked to create the outermost Web page layout (shown in FIG. 6 as element 620), where this outermost layout corresponds to the static areas 505, 510, 540 in FIG. 5. The same code that invokes C1, referred to in FIG. 6 as "invoker", then invokes another component "C2" to create dynamic content (illustrated in FIG. 6 as element 630). This dynamic content will (for purposes of this example) be generated in one form for requesters identifying themselves with one corporation's contract, and in another form for other requesters. Using this "separate and independent" application design, the origin server may return the outermost Web page layout to the fragment cache/assembler for caching, where this outermost page layout will contain an ESI include statement to subsequently retrieve the dynamic content for a particular requester. For example, a user identifier may be specified as a parameter on the ESI include statement, such that the fragment cache/assembler's request for the child fragment will pass the requesting user's identifier to the invoker, which can then pass it to component C2. The fragment cache/assembler may then have fragments 631, 632 cached for multiple users, and can assemble a complete response 601, 602 by merging the user-specific fragment with the outermost page layout.

The approach shown in FIG. 6 works nicely with the fragmented Web page design in FIG. 5 because the application in FIG. 6 is structured such that the generator of the dynamic fragments (e.g., component C2) is separate and independent from the generator of the container (i.e., component C1). However, the application in FIG. 6 is not designed to adhere to the page-level MVC architecture. That is, the generators of the container and of the dynamic fragments are not designed as views that operate upon a page-level model in response to invocation by a controller.

Figure 7:
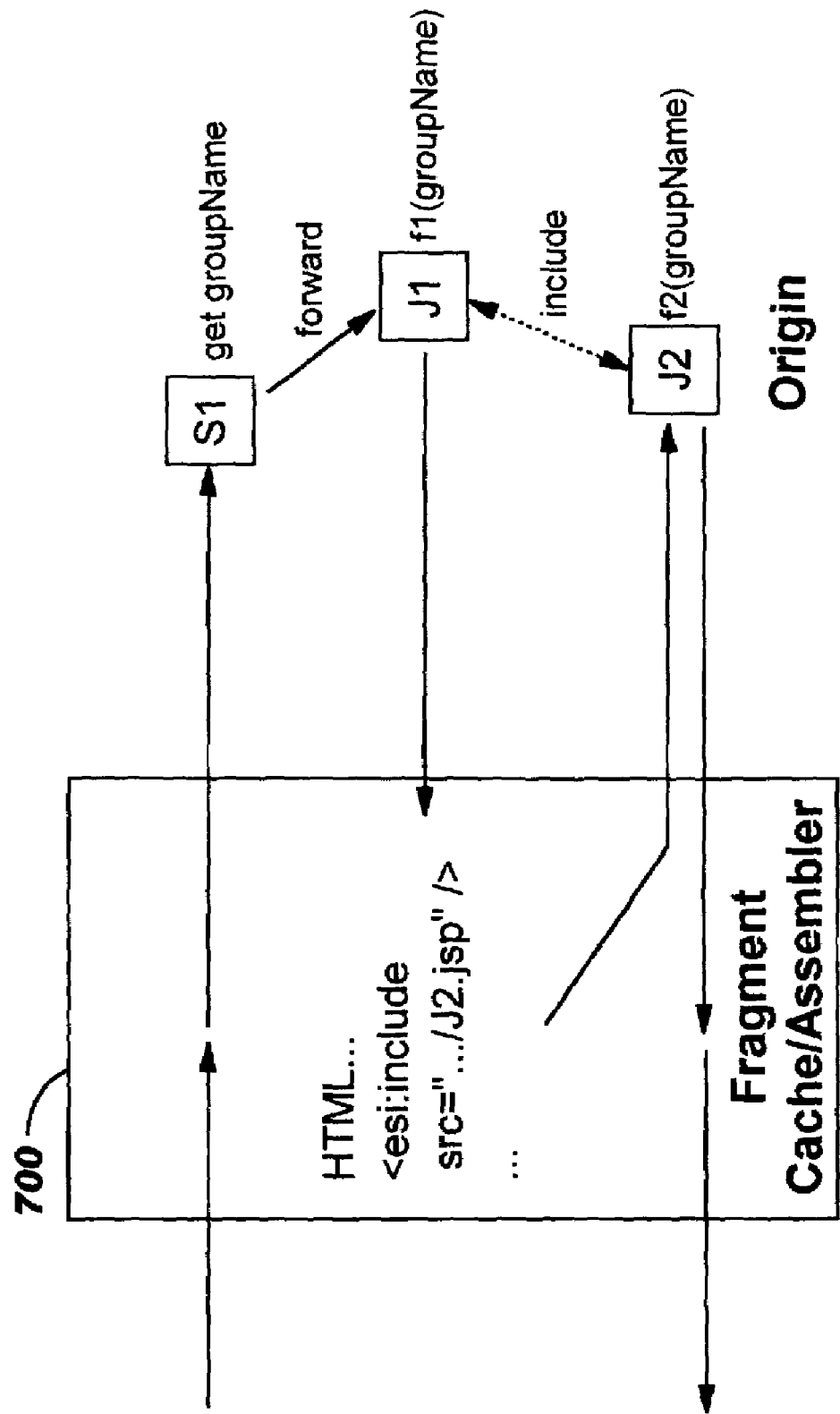
FIG. 7 illustrates why applications designed using page-level model-view-controller architecture may fail to exploit distributed fragment caching and assembly.

FIG. 7 illustrates why applications designed with page-level MVC may fail to exploit distributed fragment caching and assembly. Here, servlet S1 is designed to invoke component J1, as in FIG. 4, but now J1 emits its content and, rather than invoking J2 directly, J1 (or S1, alternatively) creates an ESI include statement within this content that identifies J2 as the creator of a required dynamic fragment. Referring back to the database access and report-generating example (discussed with reference to FIG. 4), J1 may format a report using data in a column of the model retrieved from the database by controller S1 for a particular groupName, relying on J2 to perform the calculations to be displayed within that report. To divide the content into fragments for dynamic fragment caching, J1 now generates the <esi:include> statement that identifies J2 (as shown at 700 in FIG. 7), but J2 no longer runs in-line with J1. Instead, it will execute in response to receiving a content request from the fragment cache/assembler. J2 has therefore been given an external interface, such that it can be invoked to return a fragment dynamically. However, the code in J2 was not designed for this type of external invocation. J2 has no model (i.e., collection of data) to use in its processing; instead, J2 was designed to depend on another component (J1, and indirectly S1, in this example) to obtain the data it processes. Thus, the invocation of J2 will fail.

It should be noted that applications designed according to the MVC architecture may exploit fragment caching and assembly techniques, if originally designed such that each fragment is externally-callable by an application. This may be considered "fragment-level" MVC. For example, FIG. 6 might alternatively have been designed to use fragment-level MVC.

Figure 8:
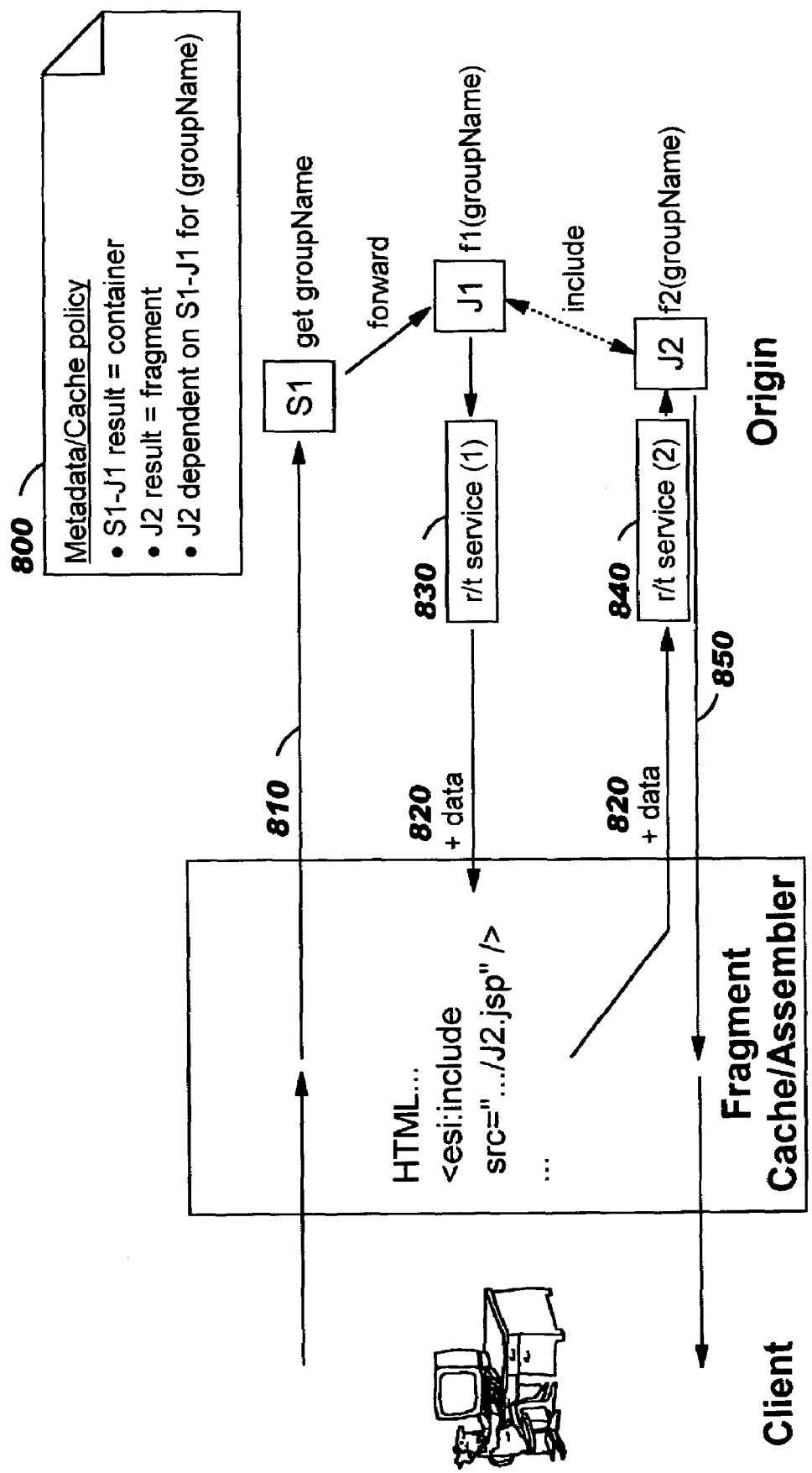
FIG. 8 illustrates how techniques disclosed herein provide distributed fragment caching and assembly for applications designed according to the page-level model-view-controller architecture shown in FIG. 4.

Turning now to FIGS. 8 and 9, the manner in which preferred embodiments solve this problem in a non-invasive way will now be described. Data is programmatically generated, according to preferred embodiments, that enables a fragment cache/assembler to carry out distributed content fragment caching and assembly for applications using the page-level MVC paradigm, without requiring change to those applications. (Note that the page-level MVC architecture is not the only architecture of concern to the present invention, but it is a representative example.) This programmatic data generation leverages information, preferably specified by the application developer, that identifies dependencies between content-generating components. This leveraged information is referred to herein as "meta-data" or "cache policy" information, and the programmatically-generated data is also referred to as "correlator data". (Note that the preferred embodiments store the data that is required for creating the child fragment, and then create a pointer to this stored data. This pointer is then used as the correlator data. Alternative embodiments may pass the data to be used when creating the child fragment in its entirety as the correlator data.)

For example, with reference to the sample application structure in FIG. 4, the meta-data would specify that component J2 is a child fragment of S1/J1, and that J2 is dependent on this parent component for data identified as "groupName". See element 800 in FIG. 8. The programmatic correlator data generation of the present invention then supplies the necessary information to allow J2 to access the data that S1 and J1 were using, even though J2 is no longer called from those components and even though the execution of J2 may be separated in time from (and will typically use a different execution thread than) the execution of S1 and J1. In the general case, the correlator data serves as a means of correlating the subsequent request with previously-stored information at the origin server.

A run-time service 830 intercepts outbound responses from the origin server, and inspects the response to determine if an embedded ESI include statement refers to a fragment-creating component that is listed in the meta-data as being dependent on another component. If so, then this run-time service attaches correlator data 820 representing server attributes (such as values from the request to which the current response is directed, the application context or other session information—which is generally transient in nature, etc.) to the outbound response message before sending it to the fragment cache/assembler. (Note that these server attributes represent data that is resident within the origin server. This is distinct from the approach used in the ESI specifications, where parameters used with ESI include messages are attributes of client requests and represent data that is available within the fragment cache/assembler. The ESI specifications have no teaching of, and no existing support for, passing origin server data.)

In alternative embodiments, rather than consulting a repository 800 to determine a component's dependencies, it may be possible, in some cases, for the correlator data to be learned. That is, the application or origin server may be adapted for inferring, from previous executions of particular fragment-generating code, which information is required for a subsequent execution. One way in which this may be done is by a static (i.e., off-line) analysis of the code to be executed, detecting the calling patterns among components, the parameters which are passed on these calls, and variables that are shared. The values of these parameters and variables can then be persisted among calls, if the components are not executed in-line, according to the present invention. Another way in which the correlator data may be inferred is to perform run-time analysis of code. For example, with reference to the example in FIG. 7, suppose that there is no existing information in meta-data 800 stating that J2 is dependent upon J1, but that it is desirable to exploit distributed fragment caching and assembly here. Initially, the origin server will need to perform in-line execution of J1 and J2, returning a complete response to the requested page. Information can then be gathered on where the calling boundaries among components are, and what parameters and variables are common across these boundaries, effectively building a table or other structure of cross-dependencies. This information can then serve as a type of rule for fragment caching, such that the requested content can then begin to be served using fragment technology. That is, rather than requiring an in-line execution of J1 and J2 in FIG. 7, this run-time approach may deduce that J2 can be treated as a fragment-generating component, and an outbound response can then be created that includes a reference to this component and the programmatically-determined correlator data it will need for restoring run-time information.

Another run-time service 840 (which may be implemented as a separate service from 830, or within a single multi-purpose service) intercepts inbound requests to the origin server, searching for correlator data that has been attached by run-time service 830. If correlator data is found, the run-time service 840 then restores the corresponding information before invoking the referenced fragment creator (i.e., before passing the inbound request to its target). (Note that the run-time services have not been depicted as intercepting the original inbound message 810 or the final outbound message 850, for purposes of clarifying how the outbound service prepares information for use by the inbound service. In actual practice, these services 830 and 840 would preferably operate on each message flow at the origin server, even though the result may be to pass the message through without change in many cases.)

In some cases, the correlator data may represent personalized information about the requester. Typically, these child fragments are not cacheable because they are user-specific. In other cases, the correlator data may represent dynamic content that is not user-specific. Typically, these child fragments are cacheable.

Examples of how the correlator data may be conveyed in either aspect include: (1) use of a new cookie on the header of the response and request; (2) passing a session identifier ("ID"), either using a session cookie or through a session ID parameter on the <esi:include> statement; (3) inclusion of a new header in the response, such as a "correlator-data" header; (4) by programmatically appending an extension, such as query parameters or path information, in the child fragment's Uniform Resource Locator ("URL"), via syntax such as "?correlator_data=ptrToStoredData"; or (5) use of specially-marked data (such as META tags, comments, etc.). It should be noted that this list is intended to be illustrative, but not exhaustive.

In situations where more than one child fragment is to be referenced, it may happen that each of these fragments has distinct correlator data. In this case, a suitable syntax may be used for identifying the correlator data for each child fragment. For example, separate cookies/headers/etc. could be used per child fragment. Or, a syntax using well-known delimiters might be used, effectively allowing the correlator data for each child to be concatenated in a manner that enables the receiver to identify a particular fragment's portion. Or, when the correlator data is simply a pointer or handle to data stored at the origin server, then a single correlator may be used for all child fragments (because it may be assumed that the creator of this combined stored information is able to identify the per-fragment information.)

When the dynamic fragment is cacheable, the value passed as correlator data may optionally be encoded and/or encrypted. For example, the data the run-time service 830 needs to invoke the creator of the child fragment may be security-sensitive. Rather than passing a pointer to this sensitive information between the origin server and fragment cache/assembler (and rather than passing the sensitive information itself), the run-time service 830 preferably encrypts the information before including it on the outbound request. The fragment cache/assembler can then use this encrypted information when returning the subsequent request for the child fragment. The encrypted value can also be used by the fragment cache/assembler as a key for storing and retrieving the child fragment to/from the fragment cache/assembler's cache, as the fragment cache/assembler does not inquire into the meaning of data attached to a response message as disclosed herein. Upon receiving an inbound request with encrypted information, run-time service 840 then performs the complementary decryption and passes the request to the creator of the child fragment. (Note that the run-time service processing inbound correlator data may optionally strip that data from the request before forwarding the request to its target.)

The run-time services 830 and 840 may be implemented as middleware, for example within a product such as WebSphere® Application Server from IBM. The run-time service 830 for outbound data may further analyze the outbound requests to determine whether the returned content is cacheable, and may then set cacheability attributes using the ESI markup language. For example, the cache policy information may contain a Boolean flag that indicates whether the output of a particular fragment-generating component is cacheable or not. This may depend, for example, on whether the data on which that component is dependent is personalized data (suggesting that the fragment will be cacheable, in the typical case).

Figure 9B:
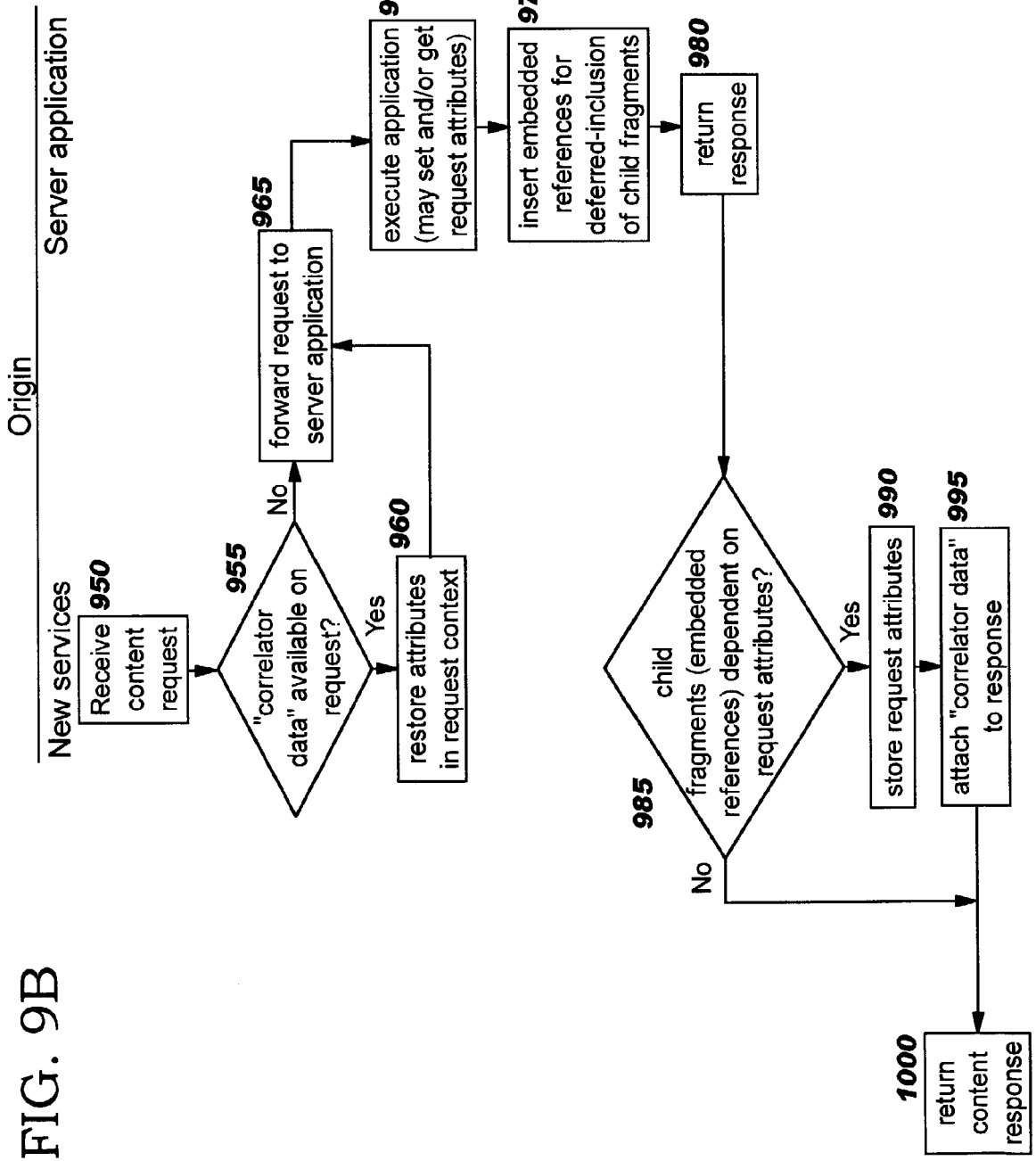

FIGS. 9A and 9B provide flowcharts depicting logic with which preferred embodiments of the present invention may be implemented. At Block 900 of FIG. 9A, a user sends a request for a URL identified as "page". When this request is intercepted by the fragment cache/assembler, the fragment cache/assembler checks (Block 905) to see if it already has content matching this identifier "page" accessible from cache. If so, processing continues at Block 915; otherwise, Block 910 forwards the request for "page" to the origin server. Upon receiving the origin server's response (described below with reference to Blocks 955–1000), processing continues at Block 915.

Block 915 sets a variable referred to in FIG. 9 as "temp" to the already-cached or just-obtained content for responding to the request for "page". Block 920 then tests to see if this variable "temp" contains any embedded references to child fragments. If not, then the fragment cache/assembler has a completed response, and this response is returned to the requesting user at Block 925.

When there is an embedded reference to a child fragment, processing continues at Block 930, which tests to see if the content for this child fragment (referred to in FIG. 9 as "child") is already accessible from the fragment cache/assembler's cache. If so, then processing continues at Block 940, and if not, then Block 935 sends a request for "child" to the origin server. Upon receiving the origin server's response (described below with reference to Blocks 955–1000), processing continues at Block 940.

Block 940 sets the variable "temp" to the result of merging the already-cached or just-obtained child fragment with the content that has thus far been assembled within the variable (which is functioning as a temporary container). Typically, this merging (as well as the other functions shown in FIG. 9 for the fragment cache/assembler) is carried out by the ESI processor. Control then returns to Block 920 to determine whether there are any more references to child fragments that have not yet been resolved.

The requests sent to the origin server from Block 910 and 935 are intercepted by the run-time service of the present invention (e.g., element 840 of FIG. 8) at Block 950 of FIG. 9B. In Block 955, the run-time service checks to see if this request includes any correlator data (i.e., correlator data that was programmatically generated for a previous outbound message, and is now being returned automatically by the fragment cache/assembler). Note that changes are not required to the fragment cache/assembler to enable it to process the programmatically-generated correlator data used by the present invention: the fragment cache/assembler will accept and return this information as part of its normal operation.

If this inbound request has no correlator data, then at Block 965 the run-time service forwards the request to the origin server (i.e., to the target application executing on the origin server, as identified by the URL of the inbound request). Otherwise, in Block 960, the run-time service restores the attributes in the request context, strips the correlator data out of the request, and then forwards the request to its target. As stated earlier, the restored attributes will allow a child fragment creator to refer to information that was created earlier, and that this creator needs in order to create the child fragment.

When the server application receives the request from the run-time service, it executes the requested functionality, as indicated at Block 970. This execution may result in setting and/or getting request attributes. That is, attributes referenced from the correlator data of the inbound request may be obtained for use in this execution, and attributes may be set by this execution that will be referenced by correlator data to be included on the outbound response. Notably, the server application does not need to be modified to accommodate this setting and/or getting, according to preferred embodiments; instead, the setting/getting is part of the already-existing application.

As shown at Block 975, the server application may insert embedded references to cause deferred inclusion of one of more child fragments. For example, these references may use the <esi:include> syntax. The server application's response is then returned (Block 980) to the requester (i.e., the fragment cache/assembler).

This outbound response is intercepted by the run-time service of the present invention (e.g., element 840 of FIG. 8) at Block 985, where the run-time service checks to see if there are any embedded references to child fragments that are dependent on request attributes or other data stored at the origin server. The meta-data 800, discussed earlier with reference to FIG. 8, is consulted to make this determination. If no dependencies are found, then it is not necessary to modify the outbound response, and it is forwarded on to the fragment cache/assembler at Block 1000.

Otherwise, when the meta-data indicates that there is a dependency for an as-yet-unexecuted creator of a child fragment, processing continues at Block 990, where the request attributes that will be used (according to the information in the meta-data) are persistently stored. Block 995 then attaches correlator data to the outbound request, enabling the run-time service 840 to locate and restore these stored attributes when the fragment cache/assembler subsequently requests the child fragment. Control then passes to Block 1000, where the modified version of the outbound response is forwarded to the fragment cache/assembler.

As has been demonstrated, the present invention provides advantageous techniques that enable extending the benefits of distributed fragment caching and assembly to applications designed according to the page-level model-view-controller paradigm. (The techniques disclosed herein may also be used advantageously with applications in general, even though those applications do not follow the page-level MVC architecture.) It should be noted that while discussions herein are in terms of using the ESI language and ESI processors for distributed fragments, this is by way of illustration and not of limitation. The techniques disclosed herein may be adapted for use with other similar distributed fragment caching techniques, without deviating from the scope of the present invention.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention may be provided as method(s) of doing business. For example, a business entity may provide a service to clients for distributing and assembling fragments of the client's content. This service may be provided under various revenue models, such as pay-per-use billing, monthly or other periodic billing, and so forth, and may offer clients advantages of reduced round-trip time for servicing requests, as well as a reduced computing burden on enterprise resources.

The present invention has been described with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include the preferred embodiments and all such variations and modifications as fall within the spirit and scope of the invention.

What is claimed is:

1. A method of enabling distributed computing applications to use distributed fragment caching and assembly in a computing network, comprising steps of:
   programmatically determining that a content response to be sent over the computing network refers to one or more components that each dynamically create a content fragment, wherein the content response responds to a request for content; and
   programmatically determining whether any of the one or more components is dependent upon another component, and/or its invoking component, for data to be used in the dynamic content fragment creation and if so, programmatically attaching correlator data to the content response for use in restoring the data to be used by the dependent components, wherein the programmatically-attached correlator data is usable by a recipient of the content response to automatically send, responsive to the recipient determining that the dynamically-created content fragment of at least one of the components that are referred to in the content response is needed, a subsequent content request over the computing network for each such needed dynamically-created content fragment, wherein the correlator data programmatically attached to the content response is automatically attached to the subsequent content request.

2. The method according to claim 1, wherein the programmatically-attached correlator data is programmatically attached for each component that is programmatically determined to be dependent and is usable for restoring the data to be used by that component.

3. The method according to claim 1, wherein the step of programmatically determining that the content response refers to one or more components further comprises the step of programmatically detecting inclusion, in the content response, of syntax referring to the one or more components.

4. The method according to claim 3, wherein the syntax comprises an include statement, for each of the referred-to components, identifying that component.

5. The method according to claim 4, wherein the include statement comprises an Edge Side Includes ("ESI") statement.

6. The method according to claim 1, further comprising the steps of:
   sending the content response with the programmatically-attached correlator data to the recipient over the computing network;
   receiving, at the recipient, the content response with the programmatically-attached correlator data;
   determining, by the recipient, that the dynamically-created content fragment of at least one of the components that are referred to in the received content response is needed; and
   using, by the recipient responsive to the determination that the dynamically-created content of at least one of the components is needed, the programmatically-attached correlator data to automatically send the subsequent content request with the automatically-attached correlator data over the computing network for each such needed dynamically-created content fragment.

7. The method according to claim 6, further comprising the steps of:
   receiving a selected one of the subsequent content requests from the recipient over the computing network;
   programmatically detecting inclusion, in the selected subsequent content request, of attached correlator data; and
   programmatically restoring, responsive to programmatically detecting the inclusion, the data to be used.

8. The method according to claim 7, further comprising the steps of:
   forwarding the selected subsequent content request to the selected one of the components that will dynamically create the content fragment; and
   creating the dynamic content fragment, by the selected component, using the programmatically restored data to be used.

9. The method according to claim 1, wherein the step of programmatically determining whether any of the one or more components is dependent further comprises the step of consulting a repository comprising component dependencies.

10. The method according to claim 1, wherein the step of programmatically attaching further comprises the steps of:
    programmatically identifying, by consulting a repository, the data to be used; and
    programmatically creating correlator data that identifies a stored version of the data to be used.

11. The method according to claim 1, wherein the step of programmatically determining whether any of the one or more components is dependent further comprises the step of programmatically inferring dependencies among components.

12. The method according to claim 11, wherein the step of programmatically inferring dependencies further comprises the step of performing static analysis of the components to determine calling patterns and shared data.

13. The method according to claim 11, wherein the step of programmatically inferring dependencies further comprises the step of performing run-time analysis of components to determine calling patterns and shared data.

14. A system for enabling distributed computing applications to use distributed fragment caching and assembly in a computing network, comprising:
    means for determining that a content response to be sent over the computing network refers to one or more components that each dynamically create a content fragment, wherein the content response responds to a request for content; and
    means for determining whether any of the one or more components is dependent upon another component, and/or its invoking component, for data to be used in the dynamic content fragment creation and if so, attaching correlator data to the content response for use in restoring the data to be used by the dependent components, wherein the attached correlator data is usable by a recipient of the content response to automatically send, responsive to the recipient determining that the dynamically-created content fragment of at least one of the components that are referred to in the content response is needed, a subsequent content request over the computing network for each such needed dynamically-created content fragment, wherein the correlator data attached to the content response is automatically attached to the subsequent content request.

15. The system according to claim 14, wherein the correlator data attached to the content response is attached for each component that is determined to be dependent and is usable for restoring the data to be used by that component.

16. The system according to claim 14, wherein the means for determining that the content response refers to one or more components further comprises means for detecting inclusion, in the content response, of syntax referring to the one or more components.

17. The system according to claim 16, wherein the syntax comprises an include statement, for each of the referred-to components, identifying that component.

18. The system according to claim 14, further comprising:
means for sending the content response with the attached correlator data to the recipient over the computing network;
means for receiving, at the recipient, the content response with the attached correlator data;
means for determining, by the recipient, that the dynamically-created content fragment of at least one of the components that are referred to in the received content response is needed; and
means for using, by the recipient responsive to the determination that the dynamically-created content of at least one of the components is needed, the correlator data attached to the content response to automatically send the subsequent content request with the automatically-attached correlator data over the computing network for each such needed dynamically-created content fragment.

19. The system according to claim 18, further comprising:
means for receiving a selected one of the subsequent content requests from the recipient over the computing network;
means for detecting inclusion, in the selected subsequent content request, of attached correlator data; and
means for restoring, responsive to detecting the inclusion, the data to be used.

20. The system according to claim 19, further comprising:
means for forwarding the selected subsequent content request to the selected one of the components that will dynamically create the content fragment; and
means for creating the dynamic content fragment, by the selected component, using the restored data to be used.

21. The system according to claim 14, wherein the means for determining whether any of the one or more components is dependent further comprises means for consulting a repository comprising component dependencies.

22. The system according to claim 14, wherein the means for attaching further comprises:
means for identifying, by consulting a repository, the data to be used; and
means for creating correlator data that identifies a stored version of the data to be used.

23. The system according to claim 14, wherein the means for programmatically determining whether any of the one or more components is dependent further comprises means for programmatically inferring dependencies among components.

24. The system according to claim 23, wherein the means for programmatically inferring dependencies further comprises means for performing static analysis of the components to determine calling patterns and shared data.

25. The system according to claim 23, wherein the means for programmatically inferring dependencies further comprises means for performing run-time analysis of components to determine calling patterns and shared data.

26. A computer program product for enabling distributed computing applications to use distributed fragment caching and assembly in a computing network, the computer program product embodied on one or more computer-readable media and comprising:

computer-readable program code for determining that a content response to be sent over the computing network refers to one or more components that each dynamically create a content fragment, wherein the content response responds to a request for content; and
computer-readable program code for determining whether any of the one or more components is dependent upon another component, and/or its invoking component, for data to be used in the dynamic content fragment creation and if so, attaching correlator data to the content response for use in restoring the data to be used by the dependent components, wherein the attached correlator data is usable by a recipient of the content response to automatically send, responsive to the recipient determining that the dynamically-created content fragment of at least one of the components that are referred to in the content response is needed, a subsequent content request over the computing network for each such needed dynamically-created content fragment, wherein the correlator data attached to the content response is automatically attached to the subsequent content request.

27. The computer program product according to claim 26, wherein the correlator data attached to the content response is attached for each component that is determined to be dependent and is usable for restoring the data to be used by that component.

28. The computer program product according to claim 26, wherein the computer-readable program code for determining that the content response refers to one or more components further comprises computer-readable program code for detecting inclusion, in the content response, of syntax referring to the one or more components.

29. The computer program product according to claim 28, wherein the syntax comprises an include statement, for each of the referred-to components, identifying that component.

30. The computer program product according to claim 26, further comprising:
computer-readable program code for sending the content response with the attached correlator data to the recipient over the computing network;
computer-readable program code for receiving, at the recipient, the content response with the attached correlator data;
computer-readable program code for determining, by the recipient, that the dynamically-created content fragment of at least one of the components that are referred to in the received content response is needed; and
computer-readable program code means for using, by the recipient responsive to the determination the dynamically-created content of at least one of the components is needed, the correlator data attached to the content response to automatically send the subsequent content request with the automatically-attached correlator data over the computing network for each such needed dynamically-created content fragment.

31. The computer program product according to claim 30, further comprising:
computer-readable program code for receiving a selected one of the subsequent content requests from the recipient over the computing network;
computer-readable program code for detecting inclusion, in the selected subsequent content request, of attached correlator data; and
computer-readable program code for restoring, responsive to detecting the inclusion, the data to be used.

32. The computer program product according to claim 31, further comprising:

computer-readable program code for forwarding the selected subsequent content request to the selected one of the components that will dynamically create the content fragment; and computer-readable program code for creating the dynamic content fragment, by the selected component, using the restored data to be used.

33. The computer program product according to claim 26, wherein the computer-readable program code for determining whether any of the one or more components is dependent further comprises computer-readable program code for consulting a repository comprising component dependencies.

34. The computer program product according to claim 26, wherein the means for attaching further comprises:

computer-readable program code for identifying, by consulting a repository, the data to be used; and computer-readable program code for creating correlator data that identifies a stored version of the data to be used.

35. The computer program product according to claim 26, wherein the computer-readable program code for programmatically determining whether any of the one or more components is dependent further comprises computer-readable program code for programmatically inferring dependencies among components.

36. The computer program product according to claim 35, wherein the computer-readable program code for programmatically inferring dependencies further comprises computer-readable program code for performing static analysis of the components to determine calling patterns and shared data.

37. The computer program product according to claim 35, wherein the computer-readable program code for programmatically inferring dependencies further comprises computer-readable program code for performing run-time analysis of components to determine calling patterns and shared data.

38. A method of enabling distributed computing applications to use distributed fragment caching and assembly in a computing network, comprising steps of:

programmatically determining that a content response to be sent over the computing network refers to one or more components that each dynamically create a content fragment, wherein the content response responds to a request for content;

programmatically determining whether any of the one or more components is dependent upon another component, and/or its invoking component, for data to be used in the dynamic content fragment creation and if so, programmatically attaching correlator data to the content response for use in restoring the data to be used by the dependent components, wherein the programmatically-attached correlator data is usable by a recipient of the content response to automatically send, responsive to the recipient determining that the dynamically-created content fragment of at least one of the components that are referred to in the content response is needed, a subsequent content request over the computing network for each such needed dynamically-created content fragment, wherein the correlator data programmatically attached to the content response is automatically attached to the subsequent content request; and charging a fee for carrying out the programmatically determining and programmatically attaching steps.

\* \* \* \* \*